July 12, 1932. M. KASSER 1,866,809
EGG PROCESSING MACHINE
Filed Nov. 10, 1926 5 Sheets-Sheet 3

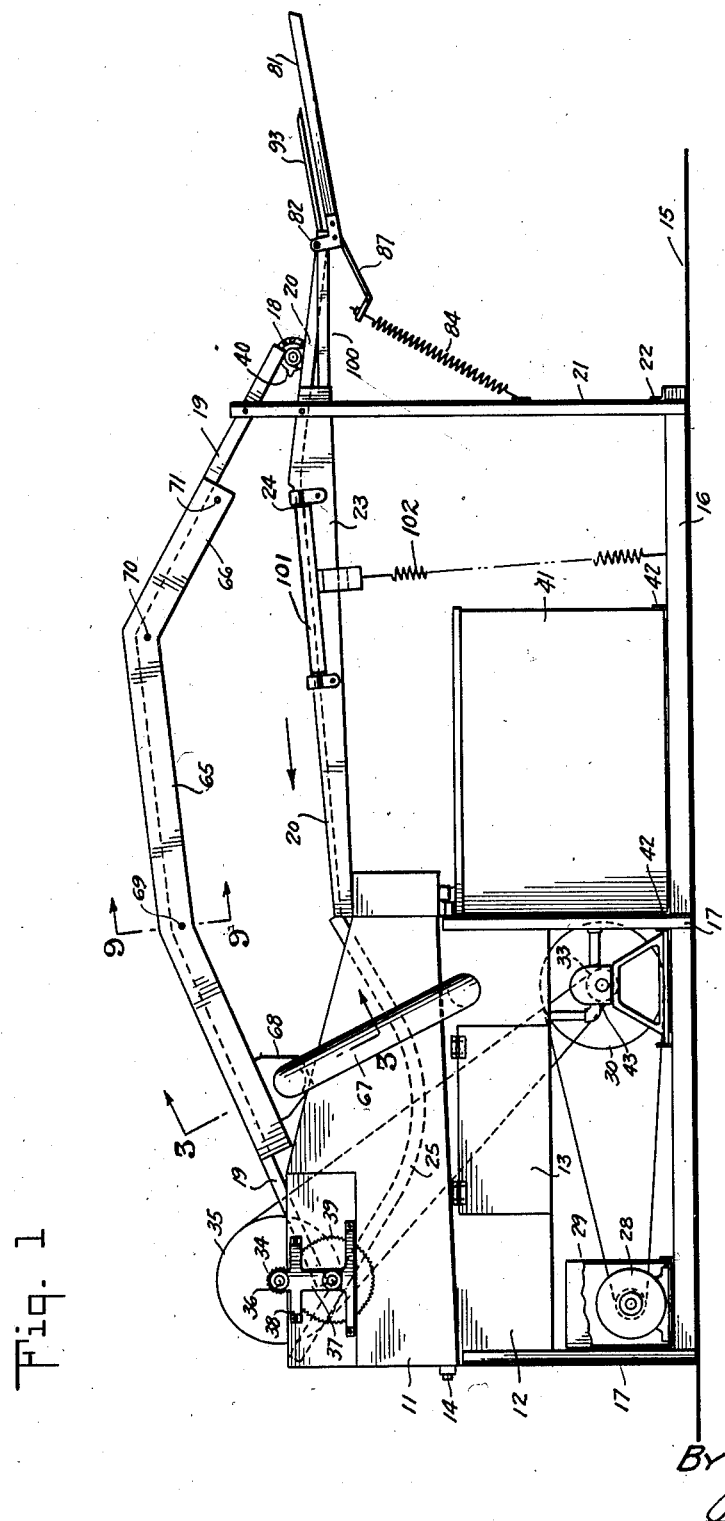

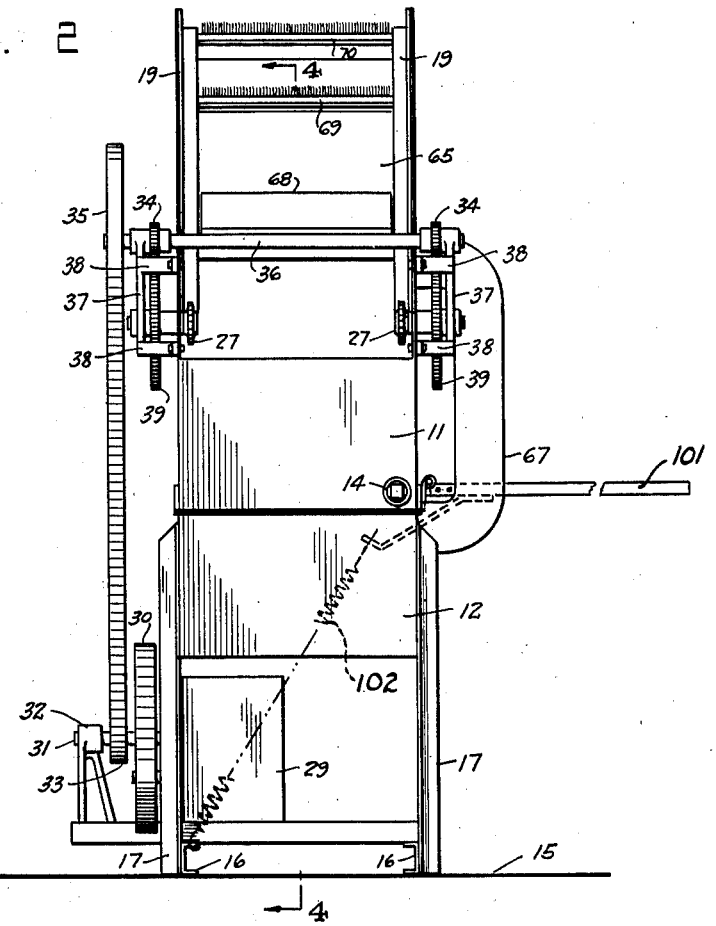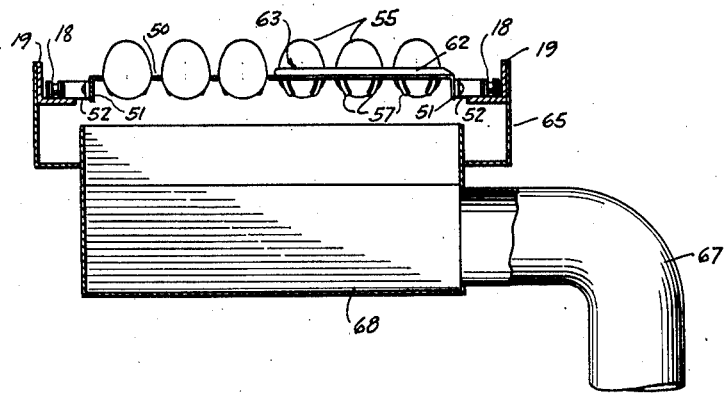

INVENTOR
MORRIS KASSER
By John Flam
ATTORNEY

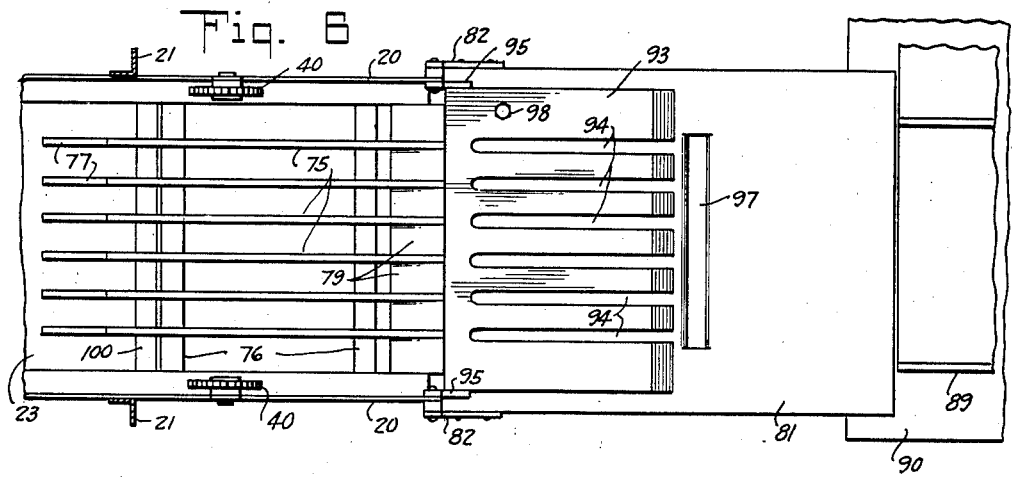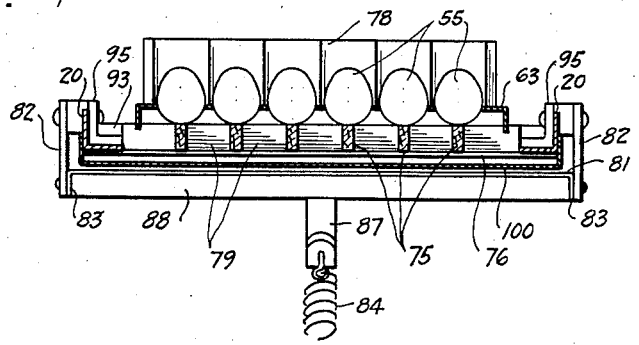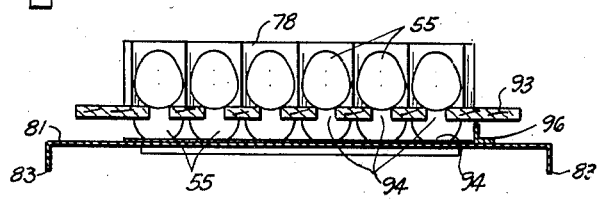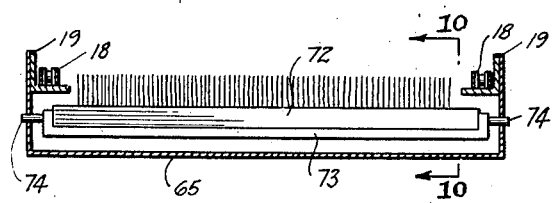

July 12, 1932.  M. KASSER  1,866,809
EGG PROCESSING MACHINE
Filed Nov. 10, 1926   5 Sheets-Sheet 5

INVENTOR
MORRIS KASSER
By John Flam
ATTORNEY

Patented July 12, 1932

1,866,809

UNITED STATES PATENT OFFICE

MORRIS KASSER, OF SAN FRANCISCO, CALIFORNIA, ASSIGNOR TO KASSER EGG PROCESS CO., OF SAN FRANCISCO, CALIFORNIA, A CORPORATION OF CALIFORNIA

EGG PROCESSING MACHINE

Application filed November 10, 1926. Serial No. 147,464.

This invention relates to a machine for treating eggs, and particularly to a device that operates to dip the eggs in a preservative solution, such as hot oil.

In one form of apparatus to accomplish these results, an endless conveyor is provided, which carries the eggs on trays or baskets through the preservative, and on toward an unloading station. A machine of this character is disclosed and claimed in my Patent No. 1,512,603 of October 21, 1924.

It is one of the objects of my invention to improve in general this type of apparatus.

It is another object of my invention to make it possible to unload the eggs from the carriers into egg crates or the like, in a more efficient and speedier manner, and without danger of hurting the eggs.

It is still another object of my invention to provide a simple and inexpensive egg tray for use with the apparatus.

It is still another object of my invention to ensure that the eggs will drain more readily after immersion in the treating liquid, thereby saving the oil.

It is still another object of my invention to make it possible to place the fillers directly after the eggs therefrom are loaded into the machine, on eggs that are ready for unloading, whereby rehandling of the fillers is avoided.

It is still another object of my invention to ensure that the liquid drained from the eggs after their travel through the preservative, will be returned to the tank or bath in which the eggs are immersed.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a side elevation, mainly diagrammatic, of a machine embodying my invention;

Fig. 2 is a left hand end view of the machine shown in Fig. 1, the conveyor chains being omitted for the sake of clearness;

Fig. 3 is a sectional view, taken along plane 3—3 of Fig. 1;

Fig. 6 is a top plan view of the unloading end, the egg trays and chains being omitted for the sake of clearness;

Fig. 7 is a sectional view, taken along plane 7—7 of Fig. 5;

Fig. 8 is a sectional view, taken along plane 8—8 of Fig. 5;

Fig. 9 is a sectional view, taken along plane 9—9 of Fig. 1, and illustrating a brushing arrangement for the eggs which operates as they are carried along by the conveyor;

Fig. 10 is a sectional view, taken along plane 10—10 of Fig. 9;

Figure 4:
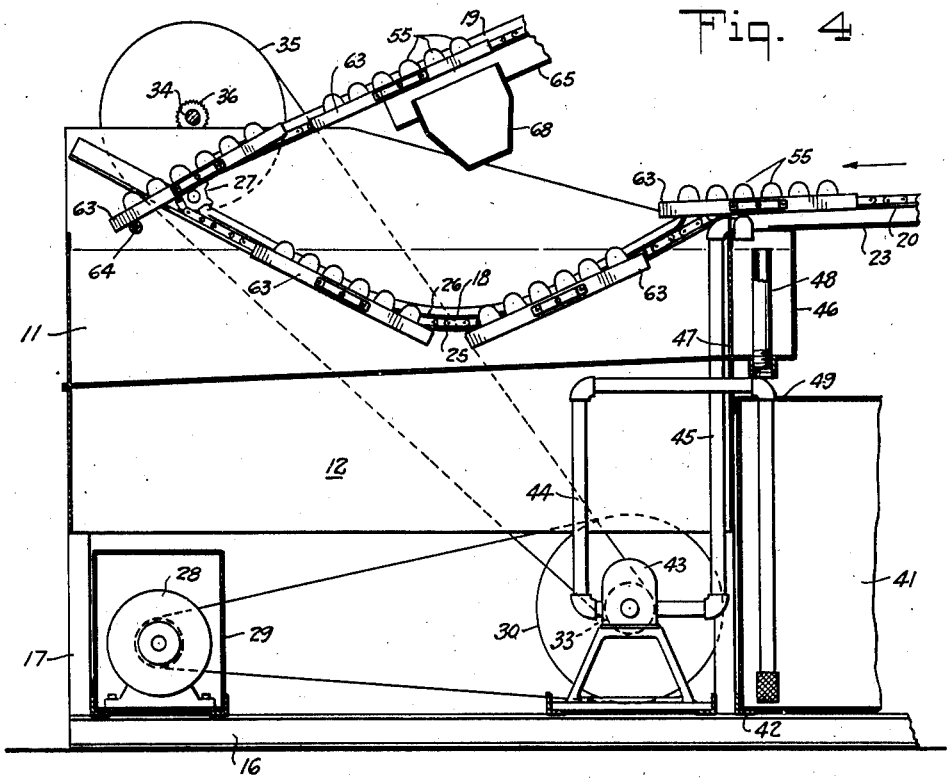
Fig. 4 is a vertical sectional view of the tank portion of the machine, taken along plane 4—4 of Fig. 2.

In the present instance, the eggs are arranged to be treated in heated oil, as by dipping, whereby they can be kept for a long period without spoiling. The oil can be kept in a tank 11 (Figs. 1, 2, and 4) which is purposely made rather shallow, and through which the eggs are passed, from one end to the other, in a manner to be hereinafter described. The tank is shown as made from sheet metal, and below the bottom thereof there is a compartment 12 for accommodating a heater (not shown). This heater may be of any conventional form for imparting heat to the oil, in the present instance by heating the bottom of tank 11. A door 13 (Fig. 1) permits access to the heater compartment. A plug 14 near the bottom of tank 11 permits withdrawal of the oil therein whenever it is desired to do so.

The support for the tank 11 and the heater compartment 12 is preferable such as to bring the tank at a convenient level above the floor 15. In the present instance, structural iron is used for the fabrication of this support, and includes a channel iron base 16, resting on floor 15, from which angle iron columns 17 support the compartment 12, to the top of which the tank 11 is welded, around the edges.

Figure 11:
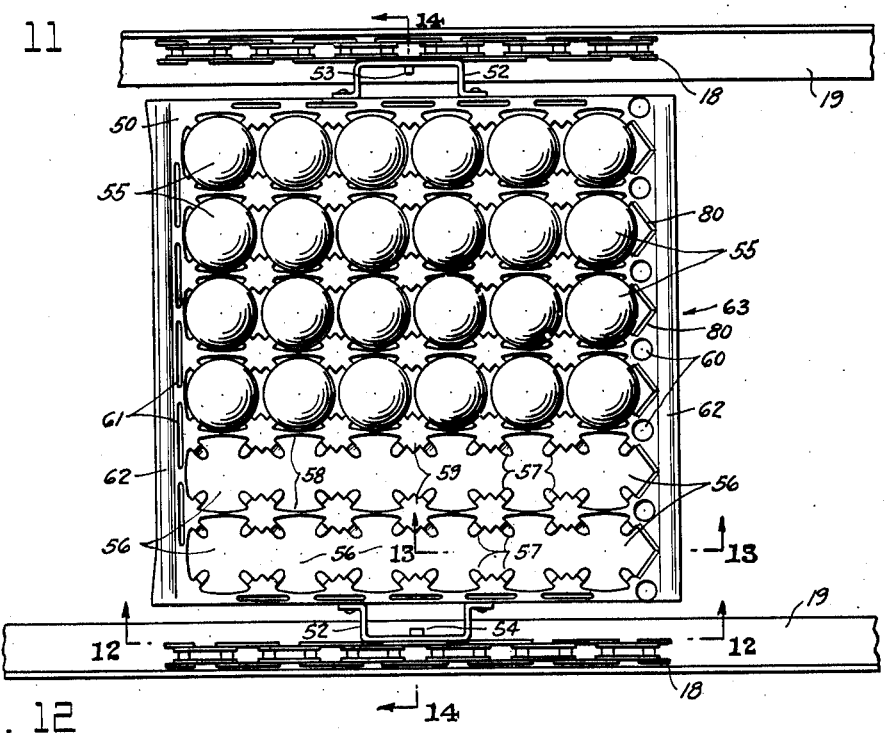
Fig. 11 is a plan view of a portion of the carrier mechanism, showing an egg carrier partly filled with eggs.
Figure 12:
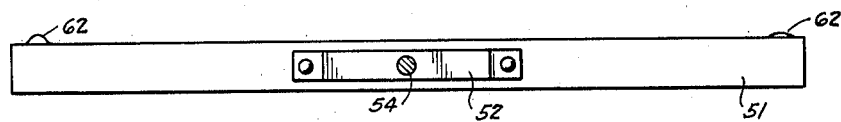
Fig. 12 is a view taken along plane 12—12 of Fig. 11.

In order to carry the eggs through the tank 11, use is made of an endless conveyor system, such as that provided by a pair of sprocket chains 18 (see especially Figs. 4, and 11). These chains are spaced apart, each being endless, and guided by one of the legs of angle iron guides 19 and 20. These guides are shown to best advantage in Figs. 2 and 3. The guides 19 provide a surface upon which the upper reach of chains 18 can slide, while guides 20 provide a similar surface for the lower reach. The angles 19 and 20 are appropriately supported adjacent the right hand end of the machine by a pair of angles 21 (Figs. 1 and 6) fastened to the channel base 16 and braced by horizontal angle 22. Furthermore, guides 20 are also braced by a drain pan 23 (Figs. 1 and 6) fastened to the angles 20 and 21 and to the top of the tank structure 11. This drain pan serves to return oil to tank 11 that flows into it from the eggs passing over the pan. The angles 20 have their vertical legs cut away for a short distance, as shown at 24 (Fig. 1) to permit ready loading of the eggs at this point, in a manner to be hereinafter described.

Figure 5:
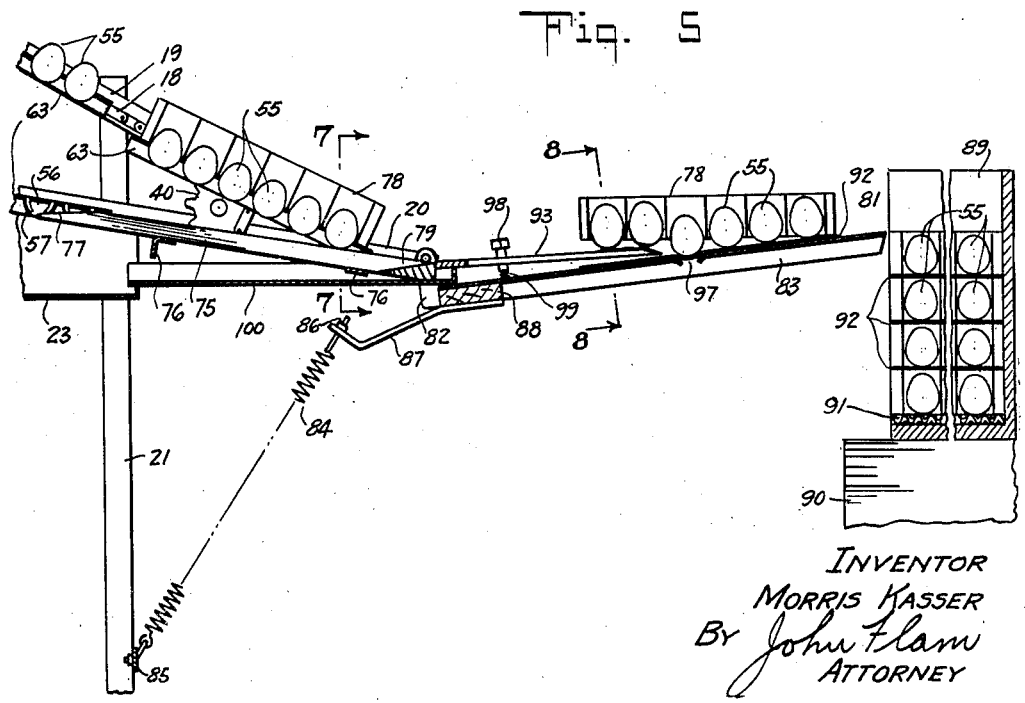
Fig. 5 is a vertical sectional view of the unloading end of the machine.

The chains 18 are guided through the tank 11 by arcuate guides 25 which are formed of angle irons and are fastened to the sides of the tank 11. These guides dip into the oil in tank 11 and connect the guides 19 and 20 at the left hand end of the machine (Fig. 5). In order to insure that the chains 18 will conform with these guides as they slide along them, supplementary guide angle irons 26 are provided, the horizontal legs of which define an arcuate groove with the horizontal legs of guides 25, through which the chains 18 pass.

Driving sprocket wheels 27 are provided at this end of the machine, supported by the sides of tank 11. They are driven from a motor 28 in a housing 29 supported on channel frame 16. The driving mechanism can best be understood from Figs. 2 and 4. Motor 28 drives a belt pulley 30 on shaft 31 supported in bearings 32 which in turn are appropriately carried by base 16. This shaft 31 carries a small belt pulley 33; and since shaft 31 extends beyond the supporting framework and toward the left as viewed in Fig. 2, the pulley 33 can drive a wheel or pulley 35 fastened to a countershaft 36 extending across the machine and supported in bearing structures 37 fastened as by feet 38 to the outside of tank 11. This countershaft 36 carries a pair of pinions 34, adjacent the ends of the shaft, and driving the gear wheels 39 fastened to the shaft of sprocket wheels 27. Idler wheels 40 (Figs. 1 and 6) at the right hand of the machine serve to guide the chains from the upper to the lower reach, the direction of travel of the chains being toward the left on the lower reach, and toward the right on the upper reach.

The guides 19 for the upper reach are arranged to guide the chains 18 upwardly as they emerge from the left hand end of tank 11; and toward the end of the travel along these guides, the chains 18 take an abrupt downward tilt toward sprocket 40. Furthermore, I provide a pumping arrangement to supply oil to tank 11 from a reservoir 41. This reservoir is supported on angles 42 connecting the sides of base 16. A pump 43 is driven from shaft 31, which pump has an intake pipe 44 extending almost to the bottom of tank 41. The outlet or discharge pipe 45 carries the oil to an overflow tank 46, connecting by aperture 47 with tank 11. This overflow tank 46 has an overflow pipe 48 which limits the level of the oil in the tank 11, for if the level should extend beyond the top of this pipe, oil passes therethrough and back into reservoir 41 through aperture 49 in the cover of said reservoir. In this way, a constant level can be maintained. Pipe 48 is adjustable in height so as to vary this level.

I shall now describe the trays for holding the eggs and the manner in which they are attached to and carried by the conveyor chains 18. The details of the tray can be best appreciated by the aid of Figs. 11, 12, 13 and 14.

I arrange the tray structure in such a way that it can readily be formed from thin sheet metal, as by punching. In general, each tray has a top or table portion 50 from which depend a pair of flanges 51 at each side. Fastened as by riveting, to the center of each of these flanges, is a U-shaped handle or projection 52, by the aid of which the tray can be attached to the chains 18. For this purpose, pins 53 and 54 are rigidly attached to links in the chains 18, and are pivotally accommodated in apertures in handles 52. The width of handles 52 is purposely made just large enough to cause their bottom surfaces to engage the guiding angles 19 or 20, as clearly indicated in Fig. 14. Thus, although the tray is pivotally mounted on pins 53 and 54, yet it cannot turn while handles 52 are disposed over any of these guides 19, 20. The plane of table portion 50 therefore stays about parallel with the direction of movement of the conveyor. It should furthermore be noted that pins 53 and 54 are of unequal size, whereby it is ensured, during the assembly of the machine, that the trays will be properly assembled on the conveyor.

The tray illustrated in Fig. 11 is shown as capable of accommodating thirty-six eggs, in six rows of six each, and the spacing of the eggs thereon is such as to conform to the cells of the ordinary fillers used in egg crates. Two of the rows (the bottom ones in this instance) of the tray are purposely shown as empty in order to disclose the structure of the tray.

Figure 13:
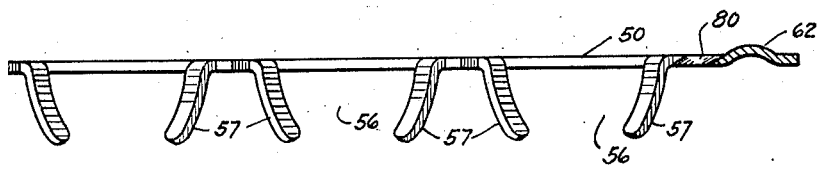
Fig. 13 is a fragmentary sectional detail, taken along plane 13—13 of Fig. 11.
Figure 14:
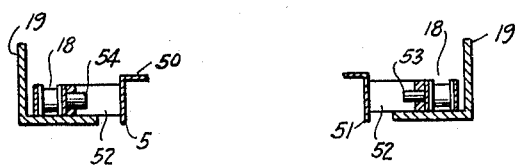
Fig. 14 is a fragmentary sectional view, taken along plane 14—14 of Fig. 11.

Eggs 55 are however shown in the other rows, each resting in individual pockets 56. Each of these pockets is formed by pressing out fingers 57 from the top of the tray and bending them below the top surface, to conform to the shape of the eggs. This is indicated in Fig. 13. Four such fingers are used for each egg pocket, which leaves the very bottom portions of the eggs exposed below the tray (as shown for example in Fig. 3) for a purpose to be hereinafter described.

In forming pockets 56, it is readily seen that substantially all of the top table surface 50 is cut away, only thin strips 58 with intermediate pieces 59 being left, from which pieces the fingers 57 depend on each side of the strips 58. Furthermore, in order further to lighten the structure, holes 60 and 61 are punched in the tray. Strengthening ribs 62, one adjacent the front and another adjacent the back of the tray, are formed in the plate forming the tray.

As the conveyor chains 18 move toward the left of Fig. 5, the trays 63 carried by the conveyor, dip into the oil in tank 11. The trays 63 are spaced quite closely along the conveyor, but of course this spacing can be varied to suit the requirements. The trays do not actually start dipping or inclining until their handles 52 leave the guides 20 and pass onto the arcuate guides 25. The links in chains 18 are from then on guided in the grooves formed between this guide 25 and angle 26, and the handles 52 are made to rest on the guides 25. The hot oil acts on the eggs in a well-understood manner, and by the time the chains 18 pass off guides 25, they have been adequately treated.

The trays 63 are carried around the driving sprockets 27 without turning over. This is accomplished by the aid of stops 64 preventing these trays from tilting more than just enough to aline them parallel with the guides 19. The trays 63 thence travel upwardly along these guides, the oil from the eggs draining into the tank 11. In order to ensure good drainage back into the tank 11 even after the eggs 55 are carried away from above the tank, an inclined drain pan 65 (Figs. 1 and 3) is disposed beneath the guides 19 and leads the oil back into the tank 11. And, as mentioned heretofore, pan 23, inclining toward tank 11, serves to lead all further drainage even after the trays leave guides 19. It is to be especially noted that the drainage to the tank 11 is complete; all oil dropping off the downwardly inclined portion 66 of the pan 65 being caught in the lower pan 23, and thence returned to the tank 11.

I ensure that the viscosity of the drained oil will not materially hinder its flow back into tank 11. For this purpose, I lead the chimney or flue 67 (Figs. 1, 2 and 3) into the pan 65 and underneath the upper reach of conveyor chains 18. This flue passes the heated products of combustion of the oil or gas heater in compartment 12 underneath the eggs, and loosens up the excess oil thereon. The flue 67 has an enlarged extension 68 projecting through the bottom of drain pan 65 and having an open top to permit the escape of the heated gases.

As the eggs 55 travel along the path of conveyor chains 18, they may also be subjected to a brushing operation in order still further to remove all moisture prior to unloading. In the present instance, pivotally mounted brushes are used, the location of the pivots being indicated on Fig. 1 at 69, 70, and 71. These are conveniently located in the sides of the pan 65, as shown most clearly in Fig. 9. The brushes 72 (Figs. 9 and 10) are formed of bristles set in a wooden back, in turn supported on the U-shaped metal bar 73 from the legs of which the pivot pins 74 extend. The weight of bar 73 keeps the brush 72 in the upright position of Fig. 9, the bristles extending sufficiently far to engage the bottom of the eggs as they go past. Of course as the brushing takes place, the brushes may be oscillated, and in fact the pivotal mounting is provided specifically to permit a yielding brushing action.

The loading of the eggs into the trays 63 is accomplished at the lower reach of the chains 18, where the guides 20 are cut away. One way in which this loading can be accomplished while the machine is in operation is by lifting a filler with eggs therein on a spade, depositing the spade over an empty tray, then pulling away the spade from between the filler and the tray. The eggs then drop into the pockets 56, and the empty filler can be placed on the top reach of the conveyor. But I prefer to utilize a tiltable table 101 (Figs. 1 and 2) pivoted to the side of pan 23, upon which table full fillers of eggs can be passed directly from an open crate onto the trays as they move past the table, thereby eliminating the necessity of using a spade. The table 101 is normally held in its upper position resiliently by the aid of a spring 102 anchored to a stationary part of the structure, and the table can be urged to the proper loading level by hand at the same time that the fillers slide on it. If desired, immediately after the eggs drop into the tray, the empty filler can be placed over a full tray of processed eggs traveling toward the right. In this way rehandling of the fillers is avoided. The ridges 62 of the tray keep such fillers properly in place over the processed eggs and in proper position for unloading in a manner to be hereinafter described. The entire machine is purposely made low enough so that these emptied fillers can conveniently be positioned on the upper trays. The cut away portion 24 of the guides 20 permits ready removal of the loading spade (if used) without interference from these guides. The spades used in the loading operation can be of the usual form—such as a flat sheet which can be passed below the eggs in a crate from which the side has been removed.

The manner in which the eggs are removed from the trays 63 forms an important part of the machine. This feature is disclosed most clearly in Figs. 5, 6, 7, and 8. In prior unloading devices, either the trays themselves were unloaded, or else the eggs were released to fall through the tray. It is evident that such unloading schemes are rather complex and expensive to produce. In my present invention, such acts are omitted, the eggs with their fillers being taken off from the top of the tray in a very simple manner now to be described.

The eggs are unloaded adjacent the right hand end of the machine, and as the trays 63 pass around the idler sprockets 40. In Fig. 5 I show a full tray 63 with a filler about to pass around these sprockets; the tray is prevented from tilting, for its front edge engages a stationary portion of the apparatus. The first operation for unloading, is downward movement of the tray with respect to the eggs, while the eggs therein maintain their level. This is readily accomplished by the aid of a series of stationary wooden bars 75 which are supported on straps 76 extending across and connecting the guide angles 20. These bars 75 each have an upper surface that engages the lower surfaces of the eggs 55, as the tray 63 moves onto the lower reach of the conveyor mechanism, this upper surface under such circumstances lying immediately below the bottom of the tray 63. A portion of an empty tray is shown at the left of Fig. 5, on guides 20, just leaving the stationary sticks or bars 75. The fingers 57 of the tray 63 do not interfere with these bars which enter between them and into the pockets 56 defined by the fingers as the tray 63 arrives at the lower reach of the conveyor. The filler 78 that had been previously placed over the eggs 55 in tray 63 can be forced down over them by the receiving operator simultaneously with the downward movement of tray 63. Thus the filler closely follows the tray movement down to the point where the filler extends substantially entirely to the bottom of the eggs. When this point in the operation is reached, the tray 63 can move away on the lower reach of the conveyor 18, in a direction opposite to the path of travel on the upper conveyor reach.

While, of course, the tray 63 is moving toward the left after the tray 63 is lowered over bars 75, yet this movement is slow enough to permit an operator to slide the filler with the eggs thus substantially freed from pockets 56, off the trays 63, thereby unloading the tray. Since the tray 63 moves upward away from bars 75, the eggs thus freed are urged by gravity to stay at the right hand end of the machine, and to leave the tray. Furthermore, in order to give him a little leeway so far as time is concerned, each bar has a tapered extension 77 (Figs. 5 and 6) upon which the eggs can slide upwardly. Since the fillers 78 are already disposed over the eggs or are placed thereover by the operator at the unloading end, all that the operator has to do is to slide the fillers with the eggs, which fillers thus ensure retaining the eggs in proper spaced relation. The fillers 78 are shown disposed over the eggs 55 in Fig. 7, which shows the tray 63 not quite completely lowered over bars 75.

In order to ensure ease in thus sliding the fillers and the eggs from the tray 63, a series of small inclined wood pieces 79 (Figs. 5 and 6) is used, located between bars 75. Should the eggs slip off the bars 75 at the right hand end, they would drop onto these inclined planes and would ride up thereon on continued sliding of the fillers to the right. In order further to facilitate this sliding, the extreme right hand pockets of trays 63 are bounded by the angles 80 (Figs. 11 and 13) which also have inclined surfaces from the bottom surface of the tray to the top surface 50. The eggs are released from the pockets 56 on these surfaces.

The fillers 78 and the eggs can be slid onto a table or the like from which they can be lifted and placed into an egg crate. However, in the present arrangement now to be described, the replacement into the empty crates can be effected in an expeditious manner. For this purpose, there is a table or slide 81, adjustably mounted at the right hand end of the machine, as by the aid of the ears 82, through which a pivot pin passes, as well as through the upright flanges of the guides 20. This table has depending side flanges 83 to which the ears are attached adjacent the left hand end of the table. Normally, the table 81 is inclined upwardly, being resiliently urged to that position by a long tension spring 84. This spring at its lower end is anchored to a stationary part 85 of the machine framework. At its upper end, it is adjustably tensioned by a bolt and nut arrangement 86 in the end of a bar 87, extending below and to the left of table 81. This bar is fastened to the wood strip 88 on the bottom of table 81. Due to the relative spacing of point 85, bolt 86 and the pivot for table 81, it is seen that the tension of spring 84 pulls the table upwardly toward the right.

A portion of an egg crate 89 is shown, the left hand side of which is removed for ready loading of the eggs therein.

This crate is positioned on a support or table 90 so that one of its compartments faces the end of table 81, which is about the same width as the compartment. As the eggs and fillers 78 are slid on the table, the operator presses on the table to aline it with the space in which the layer of eggs is to go. For example, as shown in Fig. 5, four layers of eggs have already been deposited in the crate, and there is room for one more filler. The table 81 is accordingly positioned as shown, by pressure exerted by the operator, alining the top of table 81 with the top of the stack in the crate. In this way, the filler can be moved smoothly into the crate. When beginning the stack, the usual corrugated board 91 is first laid on the bottom of the crate 89, then the table 81 is urged downwardly until its end is in alinement with this board 91. Successive layers are deposited by permitting table 81 to move upwardly in response to the resilient force of spring 84, to position it in alinement with the successive levels.

Although the loading could be accomplished as just detailed, yet I find it convenient to take care of the insertion of the flat 92 below the filler before it is loaded into the crate, instead of placing the flats 92 by hand between the layers. For accomplishing this result, I first slide the fillers 78, not directly on table 81, but upon a plate 93 lying over the table 81, whereby a flat 92 (Fig. 5) can be inserted betwen plate 93 and table 81. This plate 93 is also preferably made from wood, and can have slots 94 therein which are in alinement with the rows of eggs to seat them on the edges of the slot and keep the rows of eggs alined while they are on plate 93. This seating is clearly shown in Fig. 8.

The plate 93 is pivoted on an axis common with that of table 81, as by ears 95 positioned on the inside of angle guides 20, whereby it can be moved along with the table 81. The flat 92 is guided to the proper position beneath plate 93 by a guide 96 fastened to the table under the plate; and as the filler 78 is slid off the plate 93, the flat 92 is grasped by the fingers and pulled along with the filler 78. As the eggs slide off the bevelled end of plate 93, they fall on the flat, as clearly disclosed in Fig. 5. The filler and flat are then moved by hand on the table 81 and into the crate 89. In order to prevent the eggs from breaking, the table 81 has a slot 97 positioned adjacent the edge of plate 93, whereby the eggs fall only on the flat 92, disposed over the slot. The slot 97 also permits ready grasping of the flat as the sliding from plate 93 is begun.

While moving the eggs off plate 93, it is advantageous to rotate the plate as close to table 81 as its pivot will allow. However, in order to ensure separation of the plate and to hold it away from table 81, a screw 98 (Fig. 5) is provided as a stop. A spring 99 encompassing that portion of the screw that projects below the plate 93, is anchored to the screw, and serves as a resilient abutment for the plate 93.

If desirable, a pan 100 can be fastened below the right hand end of guides 20 for draining, and can lead into main pan 23 as shown in Fig. 5.

It is also to be understood that it has been considered unnecessary to detail the complete structure of the frame; bracing must of course be used here and there, such as between the sides of the channel base 16, and between the various upright angles fastened thereto. Of course all such bracing can readily be supplied as needed.

The description of the apparatus is now complete, and a brief summary of the operation can be set forth. As the empty trays move toward the left in Fig. 1 on the lower reach of the conveyor, they are filled with eggs from an egg crate, by the aid of loading table 101.

The trays in succession enter the right hand end of the tank 11, and emerge from the left hand end, on guides 25. Thence the trays travel to the right, all oil draining back through pans 65 and 23 to the tank 11. Finally, at the right hand end of the machine the loaded trays pass over the bars 75, causing the eggs to be freed from the trays. A flat is placed under plate 93, and a filler over the freed eggs. which are then slid by the aid of the filler onto plate 93. Next the flat is grasped by the fingers and moved toward the right simultaneously with the movement of the filler and the eggs off the plate 93; the table 81 is allowed to come into alignment with the level at which loading is to take place, and the eggs, filler and flat are moved bodily from the table into the crate. Instead of the usual flat, other types can be used, such as those having depressions for accommodating the egg tips. The operation is however the same.

The crate 89 is gradually loaded, first on one side; when that side is full, the crate can be shifted laterally to position the empty side next to table 81. When both sides are filled, the boards forming the crate side can be replaced, and the eggs are ready for shipment.

I claim:

1. In a machine for treating eggs, a tank arranged to contain the treating liquid, means for moving eggs into and out of said tank, and heating means acting on the eggs after removal from the tank for assisting in the drainage of the liquid from the eggs into the tank.

2. In a machine for treating eggs, a tank arranged to contain the treating liquid, fuel means for heating said liquid, means for moving eggs into and out of said tank, and a flue leading from the heating means and carrying heat to the eggs after removal from the tank for assisting in the drainage of the liquid from the eggs into the tank.

3. In an unloading device, an egg tray having pockets therein for accommodating eggs, means forming a surface beneath the tray, and means for causing downward movement of the tray over the surface to cause said surface to act on the bottom of the eggs to free them from the pockets.

4. In an unloading device, an egg tray having a series of rows of pockets therein for accommodating eggs, said pockets being open at the bottom, bars alined with the rows, said bars forming surfaces arranged to coact with the bottom of the eggs, and means for causing downward movement of the tray over the bars, so that they act on the bottom of the eggs to free them from the pockets.

5. In an unloading device, a conveyor, one or more trays carried by the conveyor, each of said trays having pockets for accommodating eggs, and means forming a surface below the path of travel of the conveyor and below the path of travel of the eggs, and arranged in such a location that as the trays pass downward over the bars, the eggs are stopped in their path of travel and are freed from the pockets.

6. In a machine for operating on eggs, a flat table, and a pivotal mounting for the table to permit varying its inclination, whereby fillers with eggs can be moved thereon between a storage space for eggs and the machine.

7. In a machine for operating on eggs, a flat table, a pivotal mounting for the table and yielding means for tilting said table upwards, to permit variation in the inclination of the table, whereby fillers with eggs can be moved thereon between a storage space for eggs and the machine.

8. In an unloading device for eggs, a plate upon which a filler with eggs can be deposited and a table below the plate, there being sufficient space between the table and plate to permit insertion of a flat, said table having a slot adjacent the edge of the plate, whereby upon sliding the eggs off said edge and onto the flat on the table, said eggs move onto the flat over the slot.

9. In an unloading device for eggs, a plate upon which a filler with eggs can be deposited, a table below the plate, there being sufficient space between the table and plate to permit insertion of a flat, said table having a slot adjacent the edge of the plate, whereby upon sliding the eggs off said edge and onto the flat on the table, said eggs drop on the flat over the slot, and means for permitting the inclination of the table and the plate to be varied.

10. In an unloading device for eggs, a plate upon which a filler with eggs can be deposited, said plate having slots accommodating rows of eggs, and a table below the plate, there being sufficient space between the table and plate to permit insertion of a flat, said table having a slot adjacent the edge of the plate, whereby upon sliding the eggs off said edge and onto the flat on the table, said eggs drop on the flat over the slot.

11. In a machine for operating on eggs, a conveyor having an upper and a lower reach, one or more trays carried by said conveyor, said trays having pockets for accommodating eggs, stationary means adjacent the beginning of the lower reach over which the trays pass, for freeing the eggs from the pockets, a tiltable table for permitting eggs with their fillers to slide thereon into an egg crate, means yieldingly tilting said table whereby adjustment thereof is permitted, and a tiltable plate spaced from and overlying the table adjacent its pivoted end, said plate being adjacent the stationary egg freeing means whereby the fillers and eggs can be moved from the tray onto said plate after the eggs are freed from the pockets, the eggs being movable across the plate and off its edge onto the table, the space between the table and plate being provided for a flat that can thus be moved simultaneously with the movement of the filler off the edge of the plate.

12. The process of unloading eggs from a machine and loading them into a crate from which the side is removed, which comprises placing a filler over the eggs while yet on the machine, sliding the filler and the eggs onto a plate, inserting a flat under the plate, sliding the flat and filler simultaneously onto a table so as to cause the eggs to rest on the flat, and finally moving the eggs, flat and filler on the table into the crate.

13. In a machine for treating eggs, a conveyor, a series of trays with pockets therein for accommodating the eggs, and carried by the conveyor, and means for moving the trays to the lower level of the eggs for unloading them.

14. In a machine for treating eggs, a conveyor, one or more egg trays, having egg receiving pockets and carried by said conveyor, a stationary member located adjacent the path of travel of the trays, and means causing downward movement of the trays with respect to said member, said bars acting to free the eggs by arresting their downward movement.

15. In a machine for treating eggs, a conveyor having an upper and a lower reach, one or more trays having egg receiving pockets and carried by said conveyor in upright position on both the upper and lower reach, and a stationary member adjacent the junction of the upper and lower reaches and in the path of travel of the trays as they pass from the upper to the lower reach, said member being arranged so that the tray is lowered thereover, and that said member engages the eggs to hold them stationary during the downward movement of the tray, whereby they are freed from the pockets.

16. In a system for unloading eggs from a tray having egg receiving pockets and that is moved by a conveyor having an upper and a lower reach, the process which comprises lowering the tray with the eggs onto a stationary member that engages the eggs, at that point in the tray travel where its motion is reversed between the upper and the lower reach, simultaneously moving an empty filler downward with the travel of the tray until the bottom of said filler extends substantially to the lower ends of the eggs, and holding said filler with the eggs in this position while the tray moves away therefrom.

17. In a machine for treating eggs which are removed by the aid of a filler, a conveyor, a series of trays with pockets therein for accommodating the eggs, and carried by the conveyor, and means whereby the filler can be moved down substantially to the bottom level of the eggs while the trays are in motion.

In testimony whereof I have hereunto set my hand.

MORRIS KASSER.